(12) United States Patent  
Yoon et al.

(10) Patent No.: US 8,144,200 B2
(45) Date of Patent: Mar. 27, 2012

(54) TESTING APPARATUS OF LIQUID CRYSTAL DISPLAY MODULE

(75) Inventors: Jeong-Hwan Yoon, Gyeonggi-Do (KR);
Sun-Woo Kwag, Gyeonggi-Do (KR);
Kwang-Won Yang, Gyeonggi-Do (KR);
Hyun Il Choi, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 663 days.

(21) Appl. No.: 12/318,052

(22) Filed: Dec. 19, 2008

(65) Prior Publication Data
US 2009/0303331 A1 Dec. 10, 2009

(30) Foreign Application Priority Data
Jun. 10, 2008 (KR) .................. 10-2008-0054326

(51) Int. Cl.
*H04N 17/02* (2006.01)
*H04N 7/00* (2011.01)
(52) U.S. Cl. .................. 348/189; 348/180; 348/790
(58) Field of Classification Search .................. 348/180, 348/790, 189, 553–555, 563–564, 569, 589, 348/179, 441; 345/141, 192–194, 213, 467–472; H04N 17/00, 17/02
See application file for complete search history.

(56) References Cited

U.S. PATENT DOCUMENTS

| | | | |
|---|---|---|---|
| 6,236,388 B1 * | 5/2001 | Iida et al. | 345/698 |
| 6,335,760 B1 * | 1/2002 | Sato | 348/397.1 |
| 6,798,444 B2 * | 9/2004 | Adan | 348/189 |
| 7,202,844 B2 * | 4/2007 | Nakamigawa | 345/89 |
| 7,388,623 B2 * | 6/2008 | Uehara | 348/790 |
| 2005/0073530 A1 * | 4/2005 | Kapur et al. | 345/594 |

* cited by examiner

*Primary Examiner* — Trang U Tran
(74) *Attorney, Agent, or Firm* — McKenna Long & Aldridge, LLP

(57) ABSTRACT

Disclosed is a technique for testing liquid crystal display modules which are driven in various image formats or drive frequencies by using one scanning converter, a testing apparatus of a liquid crystal display module, including: a scan box controller configured to provide a menu setting screen for setting a resolution and a drive frequency of a liquid crystal display module; a scanning converter configured to adjust and output a resolution and a drive frequency of an input image signal supplied to the liquid crystal display module according to a setting set by a user on the menu setting screen; and the liquid crystal display module configured to display an image signal of a resolution supplied from the scanning converter.

6 Claims, 5 Drawing Sheets

2. TIMING

| PIXEL CLOCK | 10.000 | MHz |
|---|---|---|
| HORIZONTAL GEOMETRY | | |
| SCAN RATE | 12.500 | MHz |
| ACTIVE | 640 | PIXELS |
| FRONT PORCH | 40 | PIXELS |
| SYNC WIDTH | 96 | PIXELS |
| BACK PORCH | 24 | PIXELS |
| TOTAL | 800 | PIXELS |
| VERTICAL GEOMETRY | | |
| REFRESH RATE | 23.855 | Hz |
| ACTIVE | 480 | PIXELS |
| FRONT PORCH | 11 | PIXELS |
| SYNC WIDTH | 2 | PIXELS |
| BACK PORCH | 31 | PIXELS |
| TOTAL | 524 | PIXELS |

FIG. 6

3. SPREAD SPECTRUM

| SPREAD RATE | |
|---|---|
| MODULATION FREQUENCY | |

FIG. 7

4. OTHER FUNCTION

| VLCD LEVEL | |
|---|---|
| LVDS LEVEL | HIGH/LOW |
| Bit | 8/10/12 |
| OUTPUT | 60Hz/ |
| INTERLACE | ON/OFF |
| PWM FREQUENCY | ~240Hz |
| FORMAT | VESA/JEIDA |

TESTING APPARATUS OF LIQUID CRYSTAL DISPLAY MODULE

This application claims the benefits of Korean Patent Application No. 10-2008-0054326, filed on Jun. 10, 2008, which is hereby incorporated by reference for all purposes as if fully set forth herein.

BACKGROUND OF THE INVENTION

1. Field of the Invention

The present invention relates to a technique for testing a liquid crystal display module, and more particularly, to a testing apparatus of a liquid crystal display module capable of testing liquid crystal modules of a variety of image formats by using one testing apparatus.

2. Discussion of the Related Art

In general, a Liquid Crystal Display Module (LCM) is a display device comprised of a liquid crystal panel having a liquid crystal filled between an upper substrate and a lower substrate, a driving unit for driving the liquid crystal panel, and a backlight.

The liquid crystal display module generally undergoes a display performance test in a development & verification stage or a testing stage, examples of which are illustrated in FIG. 1.

That is, in a case of the development & verification stage of the LCM, a display performance of a liquid crystal display module 3 is tested in which a Transition Minimized Differential Signaling (TMDS) is generated using a pattern generator 1A mounted at a Personal Computer (PC), and the generated TMDS is converted into an image signal of a Low Voltage Differential Signaling (LVDS) scheme through an interface board 2 and thereby to be provided to the liquid crystal display module 3.

In this case, since a Digital Visual Interface (DVI) value (resolution, drive frequency) is fixed, only one of various types of liquid crystal display modules 3 having different resolutions and drive frequencies would be tested.

As examples of the various types of the liquid crystal display modules 3, there are liquid crystal display modules 3 of a resolution of 1920 by 1080 pixels at a drive frequency of 120 Hz, of 1920 by 1080 pixels at a drive frequency of 60 Hz, of 1366 by 768 pixels at a drive frequency of 120 Hz, and of 1366 by 768 pixels at a drive frequency of 60 Hz.

In addition, if a dedicated testing apparatus having a pattern generator 1B is to be used, the display performance of the liquid crystal display module 3 may be tested by generating a prescribed type of a digital image signal and supplying the generated digital image signal to the liquid crystal display module 3.

In this case, the DVI value is fixed. Accordingly, only one of the various types of liquid crystal display modules 3 having a variety of resolutions and drive frequencies would be tested.

The related art testing apparatus of the liquid crystal display module uses the pattern generator mounted at the PC or the dedicated testing apparatus having the pattern generator so as to test the performance of the liquid crystal display module, thereby causing a problem of testing only one type of an image format among various image formats (different resolutions, drive frequencies, etc.).

Therefore, there have been difficulties in adjusting sequence equipment and verifying spread spectrum. In addition, pre-verification of various problems which might occur during a coupling process to a main board of a LCM set would require a lot of time and cause an inconvenience.

SUMMARY OF THE INVENTION

Accordingly, the present invention is directed to a testing apparatus of a liquid crystal display module that substantially obviates one or more of the problems due to limitations and disadvantages of the related art.

Therefore, an advantage of the present invention to provide a technique for testing liquid crystal display modules which are driven in various image formats or drive frequencies by using one scanning converter.

To achieve this and other advantages and in accordance with the purpose of the present invention, as embodied and broadly described herein, there is provided a testing apparatus of a liquid crystal display module, including: a scan box controller configured to provide a menu setting screen for setting a resolution and a drive frequency of a liquid crystal display module; a scanning converter configured to adjust and output a resolution and a drive frequency of an input image signal supplied to the liquid crystal display module according to a setting set by a user on the menu setting screen; and the liquid crystal display module configured to display an image signal of a resolution supplied from the scanning converter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the present invention.

In the drawings:

FIG. 3 is an exemplary menu screen of resolution and a power setting according to an exemplary embodiment of the present invention; and FIGS. 4 through 7 are enlarged views each showing menus displayed on the menu screen in FIG. 3.

DETAILED DESCRIPTION OF THE ILLUSTRATED EMBODIMENTS

Description will now be given in detail to embodiments of the present invention, examples of which are illustrated in the accompanying drawings.

Figure 1:
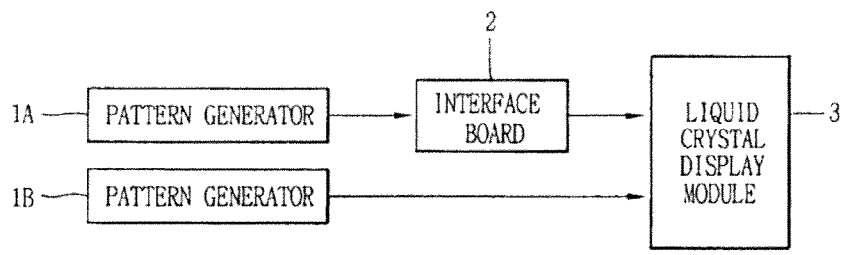
FIG. 1 is a block diagram of a related art testing apparatus of a liquid crystal display module.
Figure 2:
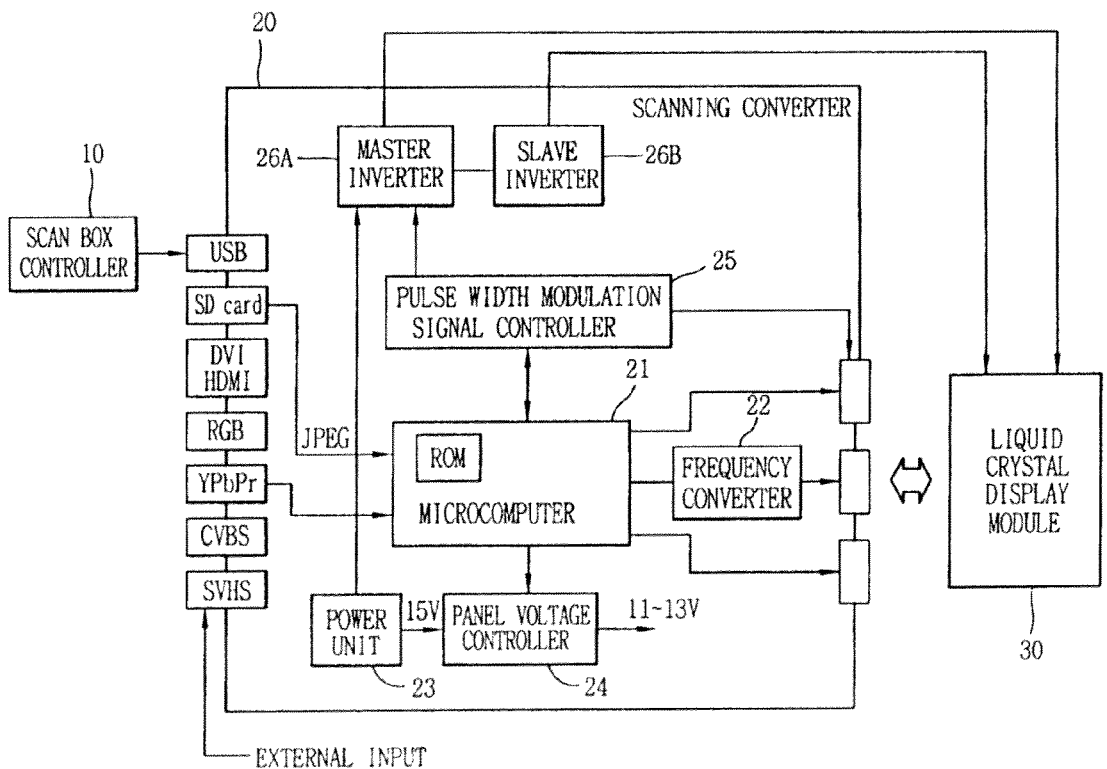
FIG. 2 is a block diagram of a testing apparatus of a liquid crystal display module according to an exemplary embodiment of the present invention.
Figure 4:
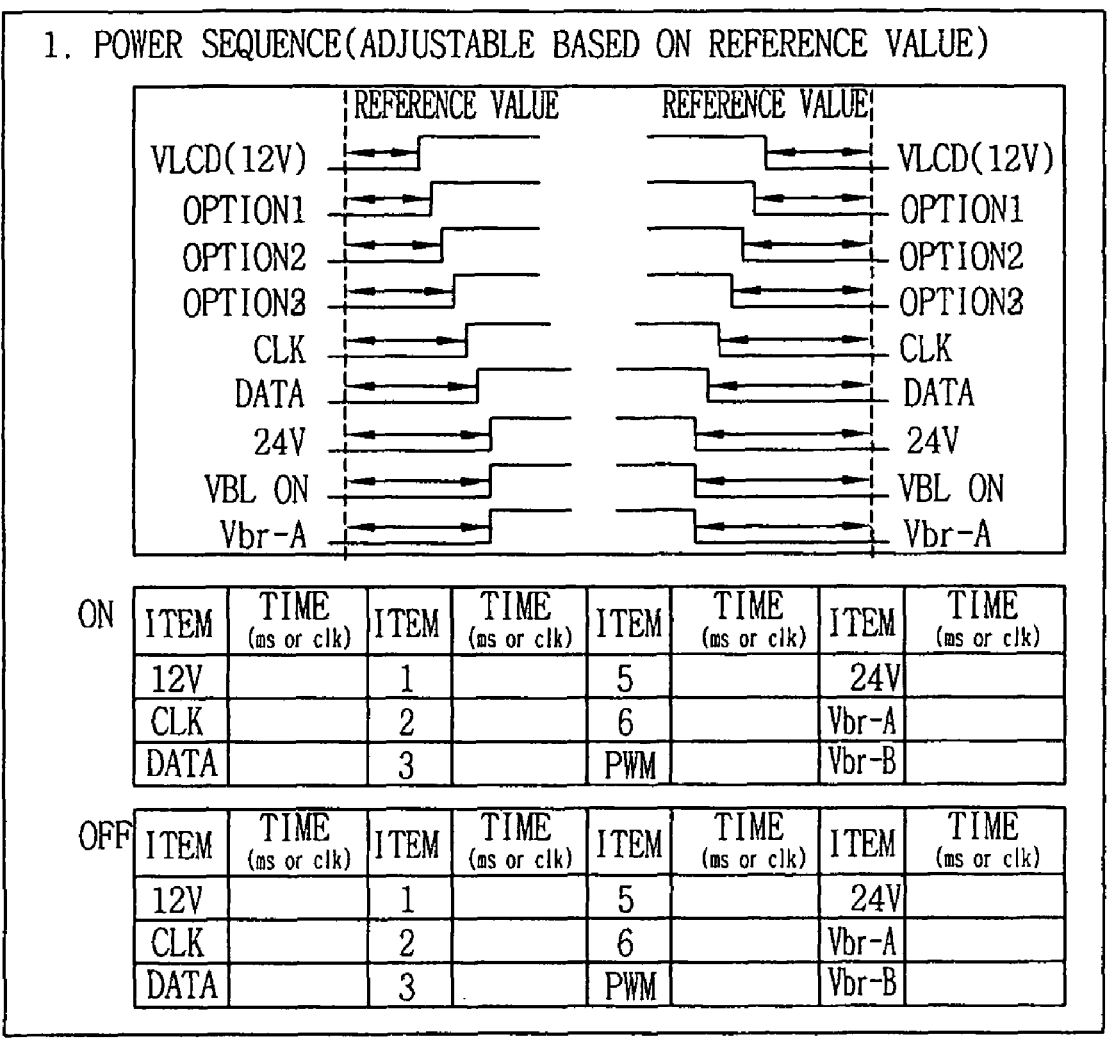

FIG. 2 is a block diagram of a testing apparatus of a liquid crystal display module according to an exemplary embodiment of the present invention. As shown in FIG. 2, the testing apparatus of a liquid crystal display module may include a scan box controller 10 configured to provide a menu setting screen for setting a drive frequency, timing, a power sequence, a spread spectrum and the like; a scanning converter 20 configured to adjust and output a power supplied to a liquid crystal display module 30 or a resolution, a drive frequency and a spread spectrum of an image signal to be input according to a menu setting set by a user on the menu setting screen; and the liquid crystal display module 30 configured to be driven by the power supplied from the scanning converter 20 and the drive frequency so as to display an image signal of a corresponding resolution.

The scanning converter 20 may include a microcomputer 21 configured to output a control signal to adjust a power supplied to the liquid crystal display module 30 or a resolution, a drive frequency, a spread spectrum, etc. of an image signal to be input according to a menu setting status set by the user on the menu setting screen; a frequency converter 22 configured to set for output a drive frequency of the liquid crystal display module 30 to 60 Hz or 120 Hz, or other frequencies under a control of the microcomputer 21; a panel voltage controller 24 configured to output a certain level of a panel voltage (e.g., 11V~13V) to the liquid crystal display module 30 by using a certain level of voltage (15V) supplied from a power unit 23; a pulse width modulation signal controller 25 configured to output a Pulse Width Modulation (PWM) signal of a corresponding duty ratio under a control of the microcomputer 21; and a master inverter 26A and a slave inverter 26B each configured to control an output voltage or current of a backlight so as to correspond to the pulse width modulation signal of a duty ratio adjusted by a user and thereby to provide a backlight of a corresponding brightness.

With such configuration, descriptions of an operation of the present invention will be given in detail with reference to FIGS. 3 through 7.

Image signals of a variety of formats are input from an external pattern generator, a DVD or the like through external input terminals (DVI, HDMI, RGB, YPbPr, CVBS, SVHS) of the scanning converter 20.

The user sets a drive frequency, timing, a power sequence, a spread spectrum and the like on a menu screen of the scan box controller 10. Here, the microcomputer 21 of the scanning converter 20 performs a control of the power sequence so as to correspond to the setting value as well as increases or reduces a resolution of an input image signal for output.

By doing this, the liquid crystal display module 30 can be driven in a resolution or a drive frequency desired by a buyer, and detailed description thereof will be described as below.

Figure 3:
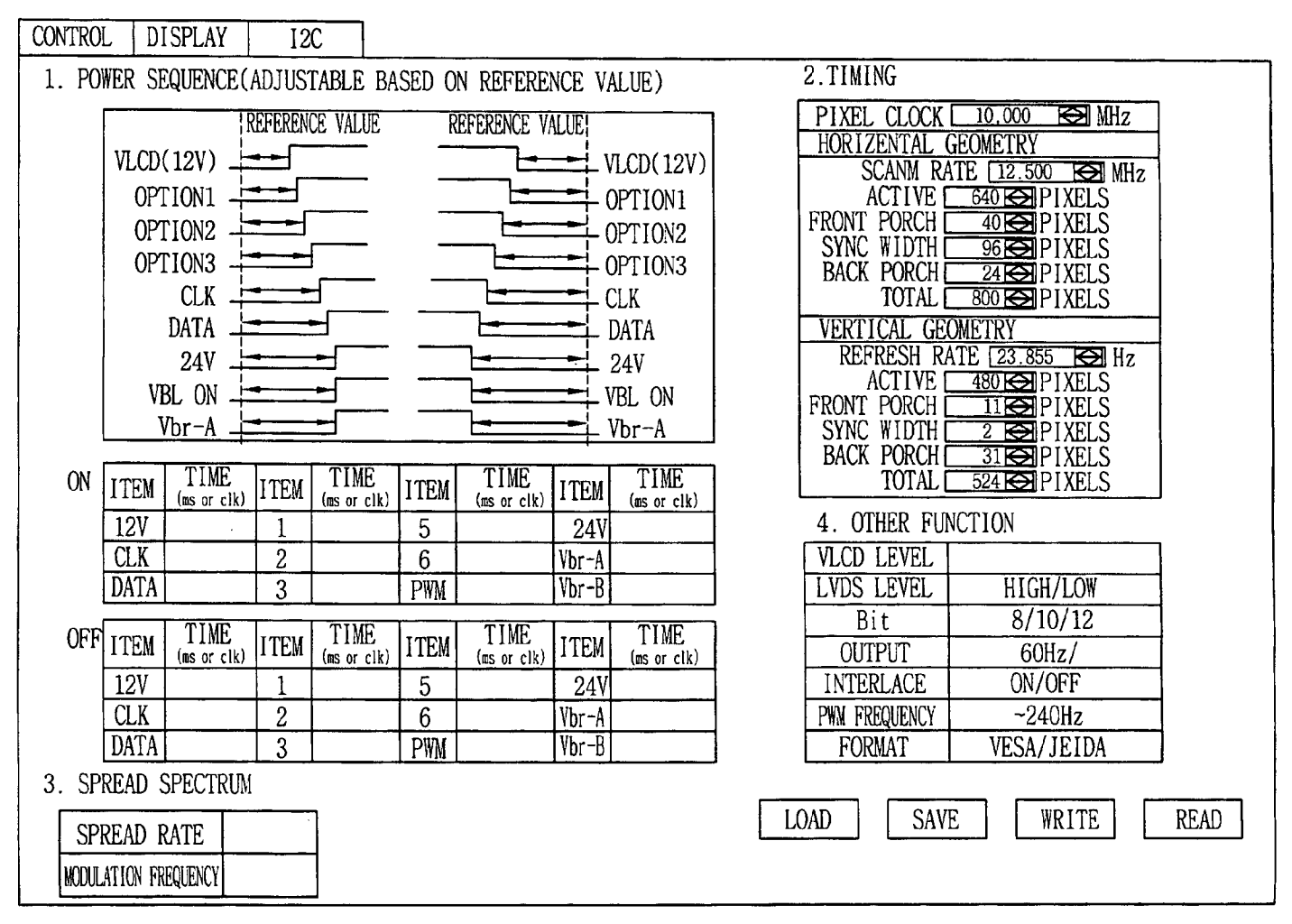

FIG. 3 shows a menu setting screen for setting a drive frequency, timing, a power sequence, a spread spectrum by the scan box controller 10.

The user sets, on the menu setting screen as shown in FIG. 3, VLCD (12V), options (options 1~3), clock signal (CLK), data (DATA), voltage (24V), backlight (VBL ON), brightness control voltage of an inverter (Vbr-A) to a required time (ms) or clock (clk), in cases of power on and/or power off of the power sequence.

The microcomputer 21 outputs a power control signal (SDA/SCL) according to the set value. Here, when the pulse width modulation signal controller 25 is to output a pulse width modulation signal to the liquid crystal display module 30 by using a certain level of voltage (24V) supplied from the power unit 23, the pulse width modulation controller 25 converts the power control signal (SDA/SCL) inputted in the form of a digital signal from the microcomputer 21 into an analog signal, and then adjusts a duty ratio of a pulse width modulation signal so as to correspond to a value of the converted analog signal.

Accordingly, the master inverter 26A and the slave inverter 26B can adjust an output voltage or current of the backlight so as to correspond to the pulse width modulation signal of the adjusted duty ratio, thereby providing the backlight at a corresponding brightness level.

Here, the pulse width modulation signal controller 25 may directly output the D/A (digital to analog) converted-power control signal (SDA/SCL) and the pulse width modulation signal having the adjusted duty ratio to the liquid crystal display module 30, when needed.

In addition, the microcomputer 21 performs a control of the panel voltage controller 24 based on the set value. Thusly, when the panel voltage controller 24 outputs a certain level of a panel voltage (e.g., 11V~13V) to the liquid crystal display module 30, the panel voltage controller 24 sets and outputs a panel voltage for a test within the certain level (e.g., 11V~13V).

Meanwhile, the user adjusts a pixel clock and an active value of a horizontal geometry on the menu setting screen as shown in FIG. 3 for a resolution adjustment, as well as sets a scan rate, a front porch, a sync width, a back porch, a total value and the like.

In addition, the user adjusts an active value of a vertical geometry, and sets a refresh rate, a front porch, a sync width, a back porch, a total value and the like.

In response to such adjustments and settings, the microcomputer 21 uses an internal scaler to horizontally enlarge or reduce image signals of a variety of formats inputted through the external input terminals (DVI, HDMI, RGB, YPbPr, CVBS, SVHS) and then to vertically enlarge or reduce the same, thusly to output the image signals appropriate to a desired resolution.

By the above process, the image signal supplied from the scanning converter 20 to the liquid crystal display module 30 may be output as an image signal of a resolution of 1920 by 1080 pixels at a drive frequency of 120 Hz or 60 Hz, of 1920 by 1080 pixels at a drive frequency of 50 Hz or 60 Hz, of 1366 by 768 pixels at a drive frequency of 100 Hz or 120 Hz, and of 1366 by 768 pixels at a drive frequency of 50 Hz or 60 Hz.

Meanwhile, the user sets a spread rate value and a modulation frequency value so as to reduce Electromagnetic Interference (EMI) on the menu setting screen as shown in FIG. 3.

In order to set other functions, the user sets, on the menu setting screen as shown in FIG. 3, the level of image signal (LVDS) output to the liquid crystal display module 30 from the scanning converter 20 to High or Low, an output bit to 8 bits, 10 bits or 12 bits, a frequency of an output port to 60 Hz or 120 Hz, interlace to On or Off, the PWM frequency to be in the range of 240 Hz, and a video card standard to VESA or JEIDA.

As so far described, explanations of the moving image signals of various formats inputted through the external input terminals (DVI, HDMI, RGB, YPbPr, CVBS, SVHS) of the scanning converter 20 have been given. However, a still image signal (JPEG) may be supplied to the microcomputer 21 of the scanning converter 20 via an SD card (or USB port), and then to the liquid crystal display module 30 by adjusting a resolution thereof through the above process.

In addition, an RF input terminal may be added to the external input terminals of the scanning converter 20. Description of the testing of the liquid crystal display module has been given, however, the present invention is not limited to the testing of the liquid crystal display module and may also be applied to a PDP testing.

The foregoing embodiments and examples are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

It will be apparent to those skilled in the art that various modifications and variations can be made in the present invention without departing from the spirit or scope of the invention. Thus, it is intended that the present invention cover the modifications and variations of this invention provided they come within the scope of the appended claim and their equivalents.

What is claimed is:

1. A test apparatus of a liquid crystal display module, comprising:
   a scan box controller configured to provide a menu setting screen for setting a resolution and a drive frequency of a liquid crystal display module;
   a scanning converter configured to adjust and output a resolution and a drive frequency of an input image signal supplied to the liquid crystal display module according to a setting set by a user on the menu setting screen; and
   the liquid crystal display module configured to display an image signal of a resolution supplied from the scanning converter,
   wherein the scanning converter comprises:
      a microcomputer configured to output a control signal to adjust a power supplied to the liquid crystal display module or a resolution, a drive frequency, a spread spectrum of an image signal to be input according to a menu setting status set by the user on the menu setting screen;
      a frequency converter configured to set for output a drive frequency of the liquid crystal display module under a control of the microcomputer;
      a panel voltage controller configured to output a certain level of a panel voltage to the liquid crystal display module by using a certain level of voltage supplied from a power unit;
      a pulse width modulation signal controller configured to output a pulse width modulation signal of a corresponding duty ratio under a control of the microcomputer; and
      a master inverter and a slave inverter each configured to control an output voltage or current of a backlight so as to correspond to the pulse width modulation signal of a duty ratio adjusted by a user and thereby to provide a backlight of a corresponding brightness.

2. The test apparatus of claim 1, wherein the scanning converter is configured to adjust and output a power supplied to the liquid crystal display module or a resolution, a drive frequency and a spread spectrum of an input image signal.

3. The test apparatus of claim 1, wherein the frequency converter is configured to output a drive frequency of 60 Hz, 120 Hz or 240 Hz.

4. The test apparatus of claim 1, wherein the scanning converter is configured to set a level of an image signal (LVDS) inputted to the liquid crystal display module to high or low.

5. The test apparatus of claim 1, wherein the scanning converter is configured to set bits inputted to the liquid crystal display module to 8 bits, 10 bits or 12 bits for output.

6. The test apparatus of claim 1, wherein the scanning converter is configured to set interlace of the liquid crystal display module to on or off, and a video card standard to VESA or JEIDA.

* * * * *